United States Patent [19]
Biletch et al.

[11] Patent Number: 5,032,644
[45] Date of Patent: Jul. 16, 1991

[54] STYRENIC POLYAMIDE ALLOY

[75] Inventors: Harry A. Biletch, Lexington, Mass.;
Emanuiel Cooper, Nesmith, S.C.

[73] Assignee: Polysar Financial Services S.A.,
Fribourg, Switzerland

[21] Appl. No.: 538,712

[22] Filed: Jun. 15, 1990

[51] Int. Cl.$^5$ ............................................. C08L 77/00
[52] U.S. Cl. ........................................ 525/66; 525/179
[58] Field of Search ................................. 525/66, 179

[56] References Cited

U.S. PATENT DOCUMENTS 4,174,358 11/1979 Epstein .
4,350,794 9/1982 Moncur .
4,755,564 7/1988 Lindner et al. ...................... 525/66
4,873,289 10/1989 Lindner et al. ...................... 525/66

OTHER PUBLICATIONS

R. W. Dexter et al, —"m-TMI A Novel Unsaturated Aliphatic Isocyanate", Journal of Coatings Technology, 6/86, vol. 58, No. 737, pp. 43-47.

Primary Examiner—Ana L. Carrillo
Attorney, Agent, or Firm—Stevens, Davis, Miller & Mosher

[57] ABSTRACT

Polymer alloys having improved toughness comprise a blend of 20 to 30 weight percent of a polyamide; 15 to 30 weight percent of a rubbery polymer and 60 to 40 weight percent of a vinyl polymer containing 1 to 10 weight percent of a vinyl isocyanate monomer. Preferred isocyanate monomers are m- or p-isopropenyl-alpha, alpha dimethylbenzyl isocyanate.

9 Claims, No Drawings

STYRENIC POLYAMIDE ALLOY

FIELD OF INVENTION

The present invention relates to reactive polymer blends. More particularly, the present invention relates to polymer blends containing a copolymer of meta or para benzene-1-(1-isocyanate-1-methylethyl)-3 (or 4)-(-1-methylethenyl). These reactive polymers may be processed under relatively mild conditions such as in the barrel of an extruder at from 220° to 250° C. The resulting product has a good balance of properties.

BACKGROUND OF THE INVENTION

High impact polystyrene (HIPS) is known. HIPS is prepared by grafting polystyrene onto an impact modifier such as cis-polybutadiene. HIPS has a wide variety of uses. Unfortunately, HIPS has an impact strength in the range of 1.2 to 1.5 ft. lb./inch (65 JM). It is desirable to increase the Izod impact of styrenic polymers or blends of styrenic polymers with other polymers.

Nylon is a strong polymer, which may be toughened by blending it with an impact modifier such as a functionalized rubber (e.g. maleated EPDM) as disclosed in U.S. Pat. No. 4,174,358 issued Nov. 13, 1979 to DuPont (Epstein). Nylon may also be toughened by blending it with an halogenated elastomer as disclosed in U.S. Pat. No. 4,350,794 issued Sept. 21, 1982 to Monsanto (Moncur). Neither of the above patents contemplate a major component of the composition being a vinyl polymer.

The present invention provides novel reactive polymer blends based on vinyl polymers. The blends have a good balance of properties and may be processed in an extruder.

SUMMARY OF THE INVENTION

The present invention provides a reactive polymer blend comprising:

i) from 65 to 40 weight % of a copolymer which is a free radical polymerization product of a monomer mixture comprising:

a) from 99 to 90 weight % of one or more vinyl monomers selected from the group consisting of $C_{8-12}$ vinyl aromatic monomers which are unsubstituted or substituted by a $C_{1-4}$ alkyl radical; $C_{1-6}$ alkyl esters of $C_{3-6}$ ethylenically unsaturated carboxylic acids; and $C_{3-6}$ alkenyl nitriles., and b) from 1 to 10 weight % of a monomer of the formula

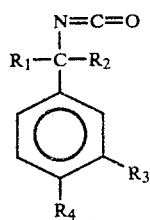

wherein $R_1$ and $R_2$ are independently selected from the group consisting of a hydrogen atom and a $C_{1-4}$ alkyl radical; and one of $R_3$ and $R_4$ is a $C_{2-6}$ alkenyl radical and the other is a hydrogen atom;

ii) from 20 to 30 weight % of a polyamide; and iii) from 15 to 30 weight % of a rubbery co- or homopolymer containing from 0.5 to 5 weight % of a chlorine or bromine atom or at least one functional monomer selected from the group consisting of: anhydrides of $C_{3-6}$ ethylenically unsaturated dicarboxylic acids., glycidyl esters of $C_{3-6}$ ethylenically unsaturated carboxylic acids; $C_{3-6}$ ethylenically unsaturated mono- or dicarboxylic acids; and $C_{3-8}$ ethylenically unsaturated nitriles.

DETAILED DESCRIPTION

The blends of the present comprise a copolymer, a polyamide and an elastomer.

The copolymer is present in the blend in an amount from 65 to 40, preferably from about 50 to 60 weight %. The copolymer comprises from 99 to 90, preferably from 98 to 96, weight % of one or more vinyl monomers selected from the group consisting of $C_{8-12}$ vinyl aromatic monomers, which are unsubstituted or substituted by a $C_{1-4}$ alkyl radical; $C_{1-6}$ alkyl esters of $C_{3-6}$ ethylenically unsaturated carboxylic acids; and $C_{3-6}$ alkenyl nitriles.

Suitable $C_{8-12}$ vinyl aromatic monomers include styrene, alpha-methylstyrene and p-tertiary butyl styrene. Suitable alkyl esters include the lower $C_{1-2}$ esters of acrylic and methacrylic acid such as methyl methacrylate, ethyl acrylate, methyl acrylate and ethyl acrylate. Suitable $C_{3-8}$ alkenyl nitriles include acrylonitrile and methacrylonitrile.

The second component in the copolymer is a vinyl isocyanate monomer of the formula

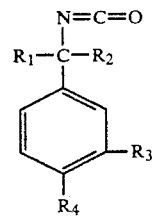

wherein $R_1$ and $R_2$ are independently selected from the group consisting of a hydrogen atom and a $C_{1-4}$ alkyl radical; and one of $R_3$ and $R_4$ is a $C_{2-6}$ alkenyl radical and the other is a hydrogen atom. Useful $C_{1-4}$ alkyl radicals include methyl, ethyl, propyl and butyl radicals. Ethenyl (vinyl), propenyl, and butenyl radicals are suitable as a $C_{2-6}$ alkenyl radicals.

Suitable vinyl isocyanate monomers include benzene-1-(1-isocyanate-1-methyl ethyl)-3-(1 methylethenyl) and benzene 1-(1-isocyanate-1-methyl ethyl)-4- (1-methylethenyl). (These monomers may also be named as m-isopropenyl-α,α-dimethylbenzyl isocyanate and p-isopropenyl-α,α-dimethylbenzylisocyanate). The monomers are also referred to by the short names m-TMI; and p-TMI.

The vinyl monomer and the vinyl isocyanate monomer are reacted under a free radical polymerization. This is desirable so that the resulting polymer will have pendent isocyanate groups capable of further reaction. The polymerization of m-TMI is discussed in the paper "M-TMI A Novel Unsaturated Aliphatic Isocyanate" Robin W. Dexter, Rober Saxon and Denise E. Fioti; Journal of Coatings Technology (June 1986) Vol. 58 pg. 43-47, the text of which is hereby incorporated by reference. One useful free radical initiator for such a polymerization is azodiisobutyronitrile (AIBN) or benzoyl peroxide. Other suitable initiators are well known to those skilled in the art. A useful solvent to conduct the polymerization in is dimethylformamide (DMF) or ethylbenzene.

The vinyl monomer and the vinyl isocyanate monomer are reacted in a weight ration from 99:1 to 90:10 preferably 98:2 to 96:4.

The polyamide may be any commercially available polyamide such as poly (hexamethylene adipamide) (e.g nylon 66); polycaprolactam (nylon 6) or poly-(omega-aminoundecane acid) (e.g. nylon 11). The polyamide may also be a mixture of commercially available polyamides. The polyamide may be used in an amount from 20 to 30 weight % of the blend.

The third component in the blend is a rubbery co- or homo-polymer which contains from 0.5 to 5, preferably from 1 to 3 weight % of a chlorine or bromine atom or at least one functional monomer selected from the group consisting of: anhydrides of $C_{3-6}$ ethylenically unsaturated dicarboxylic acids., glycidyl esters of $C_{3-6}$ ethylenically unsaturated carboxylic acids; $C_{3-6}$ ethylenically unsaturated mono- or di-carboxylic acids; $C_{3-8}$ ethylenically unsaturated nitriles. The methods for preparing such polymers are well known to those skilled in the art. For example, the functional monomers may be copolymerized with the monomers which form the rubber as is the case for carboxylated styrene-butadiene rubber (carboxylated S-BR), and nitrile rubber (acrylonitrile butadiene copolymer). Functional monomers such as acid anydrides or glycidal esters of $C_{3-6}$ ethylenically unsaturated carboxylic acids may be grafted to the polymer backbone by extruding the polymer, the functional monomer and a small amount, typically less than 0.5, preferably less than 0.1 weight % of a free radical initiator, such as hydrogen peroxide, through an extruder.

Useful rubbery polymers include ethylene-propylene-nonconjugated diene rubber (EPDM); styrene-ethylene-butadiene-styrene rubber (SEBS—prepared by hydrogenating a styrene butadiene block copolymer); styrene-butadiene rubber (SBR) and nitrile rubbers (optionally carboxylated). While the above base polymers are preferred, rubbers having a residual unsaturation may be prepared from vinylaromatic monomers such as styrene and $C_{4-6}$ conjugated diolefins such as butadiene, chloroprene, and isoprene. Further some rubbers may be homopolymers of $C_{4-6}$ conjugated diolefins such as butadiene rubber (e.g. cis-polybutadiene); isoprene (e.g. natural rubber) and chloroprene (e.g. neoprene). The rubber may also be an acrylate type polymer such as a butyl acrylate or a copolymer of methyl methacrylate butadiene and styrene, the so-called MBS type rubbery polymers, or a copolymer of methyl methacrylate (meth) acrylonitrile butadiene styrene copolymers, the so called MABS polymers.

A particularly useful anhydride of a $C_{4-6}$ ethylenically unsaturated dicarboxylic acid is maleic anhydride. Glycidyl esters of $C_{3-6}$ ethylenically unsaturated carboxylic acids include glycidyl acrylate and glycidylmethacrylate. Useful ethylenically unsaturated carboxylic acids include acrylic acid, methacrylic acid, itaconic acid and fumaric acid. Useful nitriles include acrylonitrile and methacrylonitrile. Thus the rubbers used in the present invention include maleated, epoxidized and carboxylated ethylene-propylene-nonconjugated diene monomer rubber, maleated, epoxidized and carboxylated styrene-ethylene-butadiene-stryene rubber, and maleated, expoxidized and carboxylated styrene butadiene rubber, and nitrile rubber.

The rubber is used in the blends of the present invention in the amount from 15 to 30 preferably 20 to 30 weight % of the blend. The rubber should be selected to be compatible with the vinyl isocyanate containing polymer. This compatibility may be determined using routine, non-inventive testing. Generally, the styrenic based vinyl polymers are compatible with the EPDM, SBR and nitrile types of rubbers. The acrylate vinyl isocyanate containing polymers are more compatible with the acrylate rubbers such as the MBS or MABS types of rubbers. Generally the polarity of the matrix polymer and the rubbery impact modifier should be similar.

The reactive blends of the present invention are prepared by drying the ingredients typically at about 80° C. under reduced pressure or vacuum. After the components are dried, they are tumble blended, typically for 15 to 30 minutes to assure thorough mixing of the polymer resin pellets. The blend is then extruded. The variables for the extrusion will have to be optimized to ensure reaction between the isocyanate, the amine group of the polyamide and the functional monomer of the rubber (e.g. open the anhydride, or epoxide, react with the acid or nitrile). While the conditions such as barrel temperature(s), shear rate and time should be optimized such experimentation is well known and routine in the art.

Typically the extruder will be operated at temperatures from 220° to 250° C. at residence times of about 2–5, preferably 2–3 minutes, and if the extruder has twin screws, in counter rotation mode. The extruder strands are cooled, either in a water bath or in air. The resulting strands are then chopped to the required length. The resulting pellets may then be molded (injection or compression) into useful articles.

The following examples are intended to illustrate the invention and not limit it. In the examples, unless otherwise specified parts are parts by weight (e.g. lbs.) and % are weight %.

EXAMPLE 1

Preparation of Styrene—TMI copolymer

A chain of two stainless steel 5 gallon reactors were used in a pilot plant to prepare a styrene—TMI copolymer. To the first reactor were added 30 lbs. of styrene monomer; 0.60 lbs. of TMI; 3 lbs. of ethyl benzene; and 0.52 lbs. of 70% benzoyl peroxide. The reactor was heated to 85° C. at 30% conversion the valve to reactor two was opened and there was continuously introduced into reactor one styrene, TMI, ethyl benzene, and benzoyl peroxide in the above ratio at the rate of about 3.8 liters per hour. Reactor two was operated at 93° C. After 4 hours, at a conversion of about 70% the line from reactor two into the devolatilizer was opened and the product was devolatilized at 230° C./3 Torr. After 48 hours 131 lb. of copolymer has been prepared. The copolymer contained about 2% TMI. In a similar manner, a copolymer containing about 4% TMI was prepared.

EXAMPLE 2

A series of blends were prepared. The blend comprised 60 grams of the styrene—TMI polymer with 2% TMI (STMI-2%), 20 grams of nylon, and 20 grams of various rubbers. The ingredients were dried at 110° C. under vacuum for 2 hours. Then the ingredients were tumble blended and extruded using a Leistritz 2½″ twin screw extruder in co-rotating mode at 230° C. The polymer residence time in the extruder was 3 minutes. The extruded strands were cooled and chopped into pellets. The pellets were then injection molded into test bars and the physical properties of the bars were determined by various ASTM test methods. The results are set forth in Table I.

TABLE I

| Component/Property | Compound Numbers | | | | |
|---|---|---|---|---|---|
| Component | 1 | 2 | 3 | 4 | 5 |
| STMI | 60 | 60 | 60 | 60 | 70 |
| Nylon 6 (sold under the Trademark Capron) | 20 | | | 20 | 30 |
| Nylon sold under the trade name ST811 | | | 20 | 20 | |
| Acrylic rubber (sold under the trade mark Cyanacryl) | 20 | 20 | | | |
| Polyethylene rubber (sold under the trade mark DQDA) | | | 20 | | |
| Styrene-Ethylene-Butadiene Styrene rubber with about 2% maleation sold under the trade mark Kraton FG 1901) | | | | | 20 |
| Properties | | | | | |
| Tensile Strength at Break PSI, ASTM D-638 | 4762 | 4675 | 4042 | 5604 | 5264 |
| Elongation %, ASTM D-638 | 2.14 | 1.68 | 1.46 | 34 | 1.33 |
| Modulus KPSI, ASTM D-790 | 263 | — | 332 | 272 | 463 |
| IZOD Ft. lb./in. ASTM D-256 | 0.92 | 0.6 | 0.51 | 6.7 | 0.45 |

The results show that significant improvement in properties are obtained when the rubber contains grafted maleic anhydride.

EXAMPLE 3

A series of blends of S-TMI both 2 and 4%; Nylon 12 (E-62) and Nylon 6; and maleated (2%) styrene ethylene butadiene styrene copolymer (KRATON FG 1901X) having various compositions were prepared. The compositions were blended in a Leistritz twin screw extruder and were then molded. The physical properties of the molded blend were then measured using the same best procedures as in example 2. The results are set forth in Table II.

TABLE II

| FORMULATION NUMBER | 1 | 2 | 3 | 4 | 5 | 6 | 7 | 8 |
|---|---|---|---|---|---|---|---|---|
| Composition | | | | | | | | |
| S/TMI (2%) | 6.0 | 5.0 | 6.0 | 5.0 | — | — | — | — |
| S/TMI (4%) | — | — | — | — | 6.0 | 6.0 | 5.0 | 5.0 |
| Nylon 12 (E-62) | 3.0 | — | 3.0 | — | — | — | 3.0 | 3.0 |
| Nylon 6 (Capron) | — | 3.0 | — | 3.0 | 3.0 | 3.0 | — | — |
| KRAFTON FG (1901X) | 1.0 | 2.0 | 1.0 | 2.0 | 1.0 | 1.0 | 2.0 | 2.0 |
| Residence Time (Min) | 2.0 | 4.0 | 4.0 | 2.0 | 4.0 | 2.0 | 4.0 | 2.0 |
| Temperature °C. | 250 | 220 | 220 | 250 | 250 | 220 | 250 | 220 |
| % Composition | 60/30/10 | 50/30/20 | 60/30/10 | 50/30/20 | 60/30/10 | 60/30/10 | 50/30/20 | 50/30/20 |
| Properties | | | | | | | | |
| Tensile @ Break (KPSI) | 4.4 | 4.6 | 2.2 | 5.2 | 5.6 | 5.9 | 4.4 | 4.8 |
| % Elongation | 101 | 23 | 16 | 10.2 | 2.3 | 2.1 | 31.6 | 37.7 |
| Modulus | 275 | 278 | 248 | 277 | 349 | 357 | 164 | 174 |
| IZOD (ft./lbs.) | 3.7 | 1.4 | 2.3 | 1.2 | 0.4 | 0.4 | 2.7 | 2.8 |

Table II shows
(1) The rubber should be present in an amount greater than 10% (runs 5 and 6).
(2) 50:30:20 blends of STMI:nylon:rubber are useful but not optimum (Runs 2, 4, 7 and 8).

EXAMPLE 4

A further series of blends of different nylons from various sources was made. Additionally, different rubbers were used. The nylons were: nylon 12 sold under the trademark Vestamide E-62 and Vestamide L-2140; nylon 6,6 sold under the trademarks Zytel ST811 and Ashlem 528; nylon 6 sold under the trademark Capron and a nylon sold under the trademark Elvamide 806/m. The rubbers were maleated (2%) styrene-ethylene-butadiene-styrene block copolymer sold under the trade mark Kraton F6 1910X; maleated (about 2%) ethylene propylene nonconjugated diene monomer rubber (EPD-MA) and a maleated (about 2%) styrene-butadiene block copolymer EPXF 180/1. The compounds were blended at variable compositions and were molded into test samples using a Leistritz twin screw extruder in counter rotating mode. The dwell time in the extruder was 3 minutes. The extruder barrel was profiled at 200° C., 220° C. and 240° C. for 1 series of runs and constant at 250° C. for the second series of runs. In one run for comparison a styrene-maleic anhydride-methyl methacrylate terpolymer was used in place of S-TMI. The compositions and results are set forth in Table III.

TABLE III

| FORMULATION/CONDITIONS | II - B (ESCALATING TEMP.) 3.0 MIN. ZONE 1 = 200° C., ZONE 2 = 220° C., ZONE 3 = 240° C. | | | | | | | | | III - B ALL ZONES = 250° C., 3.0 MIN | | | | | |
|---|---|---|---|---|---|---|---|---|---|---|---|---|---|---|---|
| EXPERIMENT NUMBERS | 1 | 2 | 3 | 4 | 5 | 6 | 7 | 8 | 9 | 10 | 11 | 12 | 13 | 14 | 15 |
| Components (Lbs.) | | | | | | | | | | | | | | | |
| STMI (4%) | | | | | 6.0 | | | | | | | | | | |
| STMI (2%) | 5.0 | 5.0 | 5.0 | 5.0 | | 5.0 | 5.0 | 5.0 | 5.0 | 5.0 | | 6.0 | 6.0 | 5.0 | 6.0 |
| S/MMA/MA (CF HH #5) | | | | | | | | | | | 5.0 | | | | |
| Vestamide E-62 (Nylon 12) | 3.0 | 3.0 | 3.0 | | 4.0 | | | | 3.0 | 3.0 | 3.0 | | | 3.0 | 4.0 |
| Vestamide L-2140 (Nylon 12) | | | | 3.0 | | | | | | | | | | | |
| Zytel ST811 (Nylon 6,6) | | | | | | 3.0 | | | | | | 4.0 | | | |
| Elvomide 806/M (nylon) | | | | | | | 3.0 | | | | | | | | |
| Rilsan P-40 (Nylon 11) | | | | | | | | 3.0 | | | | | | | |

TABLE III-continued

| FORMULATION/CONDITIONS EXPERIMENT NUMBERS | II - B (ESCALATING TEMP.) 3.0 MIN. ZONE 1 = 200° C., ZONE 2 = 220° C., ZONE 3 = 240° C. | | | | | | | | | III - B ALL ZONES = 250° C., 3.0 MIN | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Capron (Nylon 6) | | | | | | | | | | | | | | | |
| Ashlem (Nylon 6,6) | | | | | | | | | | | | | 2.0 | | |
| Rubbers | | | | | | | | | | | | | | | |
| KRAFTON FG 1901X | 2.0 | 2.0 | | 2.0 | | 2.0 | 2.0 | 2.0 | | 2.0 | 2.0 | | 2.0 | | |
| EPD-MA | | | 2.0 | | | | | | | | | | | | |
| EPXF 180/1 | | | | | | | | | 2.0 | | | | | 2.0 | |
| Properties | | | | | | | | | | | | | | | |
| Tensile @ Break (KPSI) | 4.3 | 4.4 | 3.8 | 4.7 | 6.0 | 3.6 | 3.8 | 4.2 | 3.1 | 4.0 | 3.4 | 5.7 | 4.7 | 3.5 | 5.7 |
| % Elongation | 61 | 56 | 45 | 58 | 4.8 | 38 | 49 | 39 | 56 | 98 | 8.4 | 1.8 | 45 | 63 | 7.4 |
| Modulus (KPSI) | 201 | 203 | 196 | 251 | 277 | 200 | 259 | 221 | 178 | 218 | 151 | 367 | 251 | 167 | 261 |
| Izod (ft./lbs./in) | 10.5 | 11.4 | 7.5 | 9.8 | 0.36 | 7.1 | 1.3 | 5.5 | 4.8 | 9.9 | 0.6 | 0.6 | 0.9 | 4.2 | 0.4 |

Table III shows:
(1)The elastomer or rubber is an essential feature of the present invention (see runs 5, 12 and 15).
(2)The terpolymer of styrene maleic anhydride methyl methacrylate does not react with nylon under the conditions at which STMI, nylon and maleated rubber react (see run 11).
(3)Runs 7 and 13 appear anomalous. It may be that the grade of nylon was not as reactive as the other grades.

We claim:

1. A reactive polymer blend comprising:
   i) from 65 to 40 weight percent of a copolymer which is a free radical polymerization product of a monomer mixture comprising:
      a) from 99 to 90 weight percent of one or more vinyl monomers selected from the group consisting of $C_{8-12}$ vinyl aromatic monomers which are unsubstituted or substituted by a $C_{1-4}$ alkyl radical $C_{1-6}$ alkyl esters of $C_{3-6}$ ethylenically unsaturated carboxylic acids; and $C_{3-6}$ alkenyl nitriles; and
      b) from 1 to 10 weight percent of a monomer of the formula

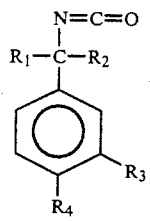

I wherein $R_1$ and $R_2$ are independently selected from the group consisting of a hydrogen atom and a $C_{1-4}$ alkyl radical; and one of $R_3$ and $R_4$ is a $C_{2-6}$ alkenyl radical and the other is an hydrogen atom;
   ii) from 20 to 30 weight percent of a polyamide; and
   iii) from 15 to 30 weight percent of rubber polymer which has been grafted with an anhydride of a $C_{4-6}$ ethylenically unsaturated dicarboxylic acid.

2. A blend according to claim 1 wherein said polyamide is selected from the group consisting of poly (hexamethylene adipamide); polycaprolactam; poly-(omega-aminoundecane acid) and a mixture thereof.

3. A blend according to claim 2 wherein said copolymer comprises a $C_{8-12}$ vinyl aromatic monomer and said monomer of formula 1 is selected from the group consisting of benzene-1-(1-isocyanate-1-methylethyl)-3(1 methyl- ethenyl); and benzene-1-(isocyanate-1-methylethyl) -4-(1-methylethyl).

4. A blend according to claim 3 wherein said rubber is selected from the group consisting of maleated ethylene propylene rubber; maleated ethylene propylene diene monomer rubber; maleated styrene-ethylene-butadiene-styrene rubber, and maleated styrene-butadiene rubber.

5. A blend according to claim 4 wherein said copolymer is present in an amount from 50 to 60 weight percent, said polyamide is present in an amount from 20 to 30 weight percent and said rubber is present in an amount from 20 to 30 weight percent.

6. A blend according to claim 5 wherein said $C_{8-12}$ vinyl aromatic monomer is selected from the group consisting of styrene, alpha-methylstyrene, p-tertiary butyl styrene.

7. A blend according to claim 6, wherein the weight ratio of vinyl monomer to monomer of formula I in component (i) is from 98:2 to 96:4.

8. A blend according to claim 7 comprising 50 to 60 weight percent of said copolymer 20 to 30 weight percent of said polyamide and 20 to 30 weight percent of a styrene-ethylene-butadiene-styrene copolymer containing from about 1 to 4 percent of a graft of maleic anhydride.

9. A blend according to claim 3 wherein said rubber is a copolymer selected from the group consisting of methyl methacrylate-styrene-butadiene copolymer and methyl methacrylate-acrylonitrile-styrene-butadiene copolymer.

* * * * *